(12) United States Patent
Chao et al.

(10) Patent No.: US 8,707,803 B1
(45) Date of Patent: Apr. 29, 2014

(54) TORQUE MEASUREMENT DEVICE

(71) Applicant: Avid Technology, Inc., Burlington, MA (US)

(72) Inventors: Gregory Hsiao-hwa Chao, Sunnyvale, CA (US); Douglas A. Peterson, Sunnyvale, CA (US); James J. McTigue, Orinda, CA (US); Edward L. Ludwick, II, Gilroy, CA (US)

(73) Assignee: Avid Technology, Inc., Burlington, MA (US)

( * ) Notice: Subject to any disclaimer, the term of this patent is extended or adjusted under 35 U.S.C. 154(b) by 22 days.

(21) Appl. No.: 13/717,767

(22) Filed: Dec. 18, 2012

(51) Int. Cl.
*G01L 3/02* (2006.01)
*G01L 3/00* (2006.01)

(52) U.S. Cl.
USPC ................................. 73/862.191; 73/862.08

(58) Field of Classification Search
USPC ....................................... 73/862.191, 862.08
See application file for complete search history.

(56) References Cited

U.S. PATENT DOCUMENTS

| 4,922,579 A * | 5/1990 | Varga | 19/105 |
| 2008/0314162 A1* | 12/2008 | Inoue | 73/862.23 |
| 2008/0315810 A1* | 12/2008 | Akita | 318/400.23 |

OTHER PUBLICATIONS

Measurement Research, Inc., M15-W Windows-based Univeral torque tester with TorqueScope, product brochure, 1990, 6 pages.

* cited by examiner

*Primary Examiner* — Lisa Caputo
*Assistant Examiner* — Jamel Williams
(74) *Attorney, Agent, or Firm* — Oliver Strimpel

(57) ABSTRACT

An apparatus for measuring torque in a rotary encoder between the encoder body and encoder shaft. The apparatus includes a rotary stage for mounting and rotating the body of the rotary encoder, a probe arm having a first end for engaging the shaft of the rotary encoder in a stationary position, and a force sensor mourned on an adjustable assembly. The adjustable assembly enables the force sensor to be placed in contact with a second end of the probe arm, such that the plane of the force sensor is parallel to a plane defined by the vertical center plane of the probe arm passing through an axis of rotation of the shaft of the rotary encoder. By rotating the encoder body at a constant speed in clockwise and counterclockwise directions and measuring torque at regular time intervals, the range of torque, torque grittiness, and torque hysteresis may be determined.

18 Claims, 4 Drawing Sheets

TORQUE MEASUREMENT DEVICE

BACKGROUND

Rotary encoders are used to enable users to adjust the values of various input, output, and processing variables in a large range of electronic devices. The angular position and motion of a rotary encoder provides the user with a good analogue of the value and change of the variable quantity that is being controlled. Devices that are used to perform audio processing, such as studio mixers and live performance consoles, often have a large number of quantities that are controlled by corresponding rotary encoders. For many operators who use such equipment in typical use cases, the rotary controls provide one of the most important components of the user interface. As such, these users become sensitive to the feel of the encoders, which is a function of several of the encoders' mechanical properties. In order to better control the ability to manufacture encoders that provide a satisfactory user feel, it is desirable to be able to measure the encoder parameters that affect the user experience. There is therefore a need for tools to facilitate quantitative measurement of these parameters.

SUMMARY

In general, the methods and apparatus described herein provide consistent and accurate measurements of torque in a rotary encoder between the encoder shaft and body. The apparatus includes a torque arm that is instrumental in converting torque to a linear force, which may be measured by a force sensor.

In general, in one aspect, an apparatus for measuring torque in a rotary encoder includes: a rotary stage for mounting and rotating a body of the rotary encoder; a probe arm having a first end for engaging a shaft of the rotary encoder in a stationary position; a force sensor mounted on an adjustable assembly, wherein adjusting the adjustable assembly enables a surface of the force sensor to be placed in contact with a second end of the probe arm such that a face of the force sensor is parallel to an axis of the probe arm and an axis of rotation of the shaft of the rotary encoder.

Various embodiments include one or more of the following features. The axis of the probe arm lies in a vertical plane bisecting the probe arm. The axis of rotation of the shaft of the rotary encoder is vertical. The axis of the probe arm intersects the axis of rotation of the shaft of the rotary encoder. The rotary stage is capable of being rotated at a constant rate. A direction of the rotation is a selectable one of clockwise and counterclockwise. At least 10 data samples per second are generated from an output of the force sensor. The apparatus is capable of measuring torque variations of less than 1 gram-centimeter. The rotary stage is capable of rotating the body of the rotary encoder at one or more speeds within the range of 0.2 RPM to 16 RPM.

In general, in another aspect, a method of measuring torque in a rotary encoder includes: mounting a body of the rotary encoder on a rotary stage; engaging a first end of a probe arm to a shaft of the rotary encoder; positioning a stationary force sensor in mechanical contact with a face of the probe arm adjacent to a second end of the probe arm such that a direction of maximum sensitivity of the force sensor is perpendicular to both an axis of the probe arm and an axis of rotation of a shaft of the rotary encoder; and measuring an output of the force sensor while the rotary stage is rotating the body of the rotary encoder.

Various embodiments include one or more of the following features. The rotary stage rotates the body of the rotary encoder at a constant speed and the measuring step comprises obtaining multiple measurements at constant temporal intervals. Measuring torque further comprises analyzing the multiple measurements to derive a range of torque corresponding to a difference between a maximum and a minimum torque value. A torque grittiness is derived based on a difference between successive measurements of the multiple measurements. The body of the rotary encoder is successively rotated in a clockwise direction with respect to the shaft and a counter-clockwise direction with respect to the shaft. Hysteresis of a rotational torque of the rotary encoder is determined based on a difference between measurements obtained while rotating the body in a clockwise direction and while rotating the body in a counter-clockwise direction.

In general, in a further aspect, a method of measuring torque in a rotary encoder includes: mounting a body of the rotary encoder on a rotary stage; engaging a first end of a probe arm to a shaft of the rotary encoder; positioning a stationary force sensor in mechanical contact with a face of the probe arm adjacent to a second end of the probe arm such that a direction of maximum sensitivity of the force sensor is perpendicular to both a plane of the force sensor and a center plane of the probe arm; and measuring an output of the force sensor while the rotary stage is rotating the body of the rotary encoder.

Various embodiments include one or more of the following features. The center plane of the probe arm is vertically aligned. An axis of rotation of the shaft of the rotary encoder lies in a plane defined by a center plane of the probe arm.

DETAILED DESCRIPTION

The rotary encoder is a common user input device in systems for audio processing. Audio mixing consoles, for example, may include a rotary encoder for setting the level of each input channel, as well as some for audio processing such as equalization, dynamics processing, for output volumes, and for other parameters. It is common for operators to have their fingers on rotary encoders for many hours at a stretch. Furthermore, the rotary encoders are often used to perform fine control of parameter values, sometimes of many parameters at once. In a live performance context, operators may need to adjust the values of many parameters by using many encoders rapidly in quick succession. It is therefore common for operators to become quite sensitive to the mechanical "feel" of the encoders that they use, and to develop quite specific requirements for what that feel should be. The feel of an encoder is determined by several of its mechanical properties. These may include the starting torque, the running torque, the range of variation of the running torque across angular range of the rotary encoder, the grittiness of the encoder, and the hysteresis.

In order to be able to control for these mechanical properties during the manufacturing process, it is important to be able to measure their values. We describe herein an apparatus that facilitates the measurement of running torque, from which torque range, grittiness, and hysteresis may be determined.

A significant aspect of the apparatus is that during measurement of encoder properties the encoder shaft is kept stationary while the body of the encoder is rotated. This is advantageous at least because it facilitates relocating the force-measuring function from the axis of rotation of the encoder to an off-axis location by means of a probe arm. Sensor alignment is more readily accomplished for an off-axis sensor position. In prior systems that deploy an on-axis torque sensor, the alignment of the center lines of the torque sensor and the encoder shaft axis is highly critical and difficult to achieve. The flexible couplers that are usually employed for setup and testing may introduce error, especially if not properly installed.

Figure 1:
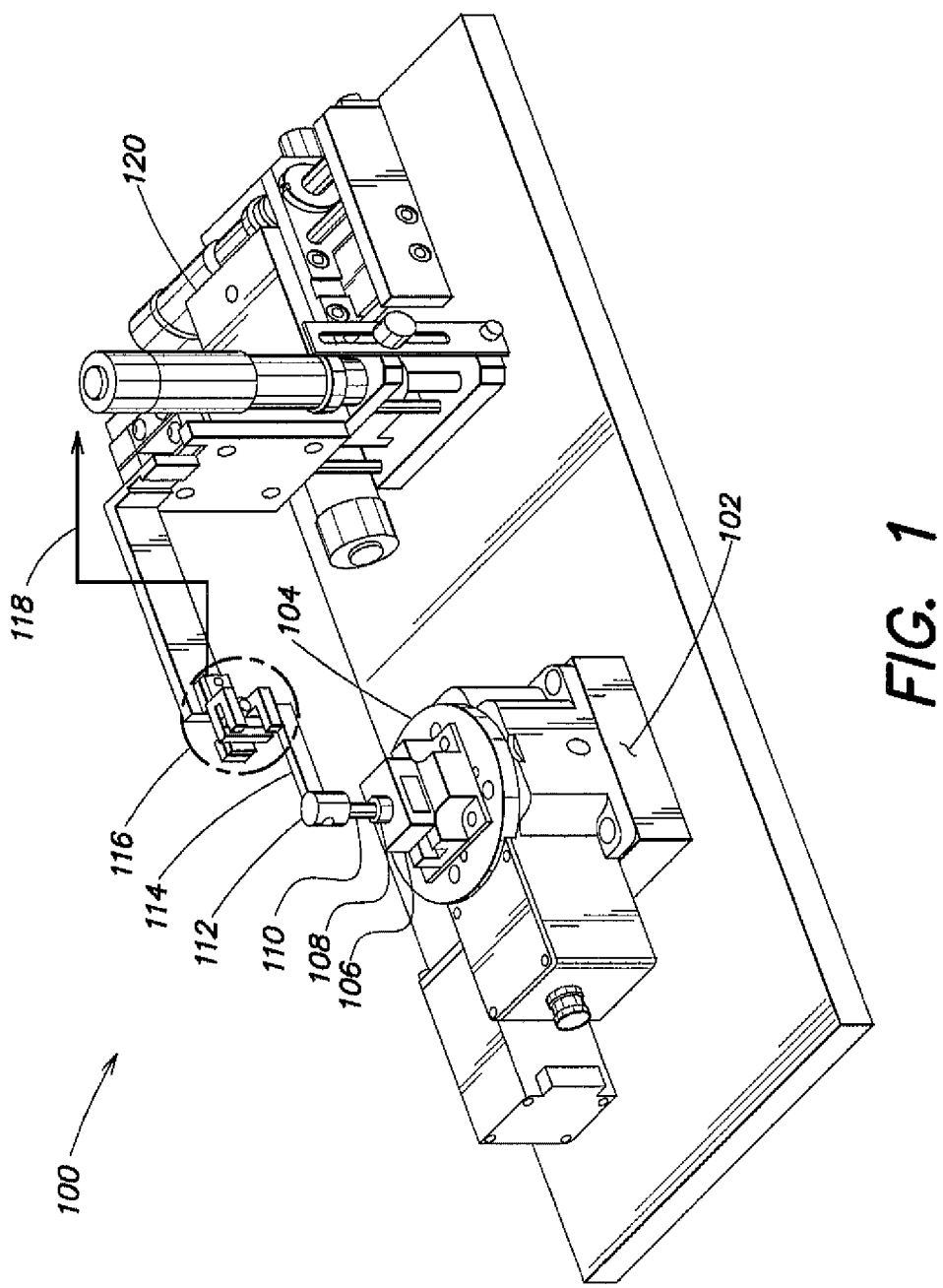
FIG. 1 is a schematic illustration of the described torque-measuring apparatus.

FIG. 1 is a schematic illustration of apparatus 100 for measuring the running torque of a rotary encoder. Mounting assembly 102 includes a stepper motor connected to rotary stage 104. During measurement, the rotary stage is rotated at speeds that include but are not limited to 0.2, 0.5, 1, 2, 4, 8, and 16 RPM in a clockwise and in a counter-clockwise direction. Mounted to the stage by means of retaining fixture 106 is the rotary encoder 108 being measured. Shaft 110 of the rotary encoder is engaged by one end 112 of probe arm 114 using a cylindrical hole with a locking screw, or by means of a securing chuck. The other end of the probe arm is engaged with the force sensor as indicated at 116. Electrical output from the force sensor is carried along cable 118 to the instrumentation (not shown) that is used to analyze the force sensor output. The instrumentation samples continuous sensor output at a rate of at least 10 samples per second, depending on the characteristics of signal conditioning hardware in the instrumentation.

Stage assembly 120 is adjustable in three dimensions, and facilitates alignment of the force sensor with respect to the probe arm and the axis of rotation of the encoder under measurement. The alignment is discussed in more detail below.

Figure 2:
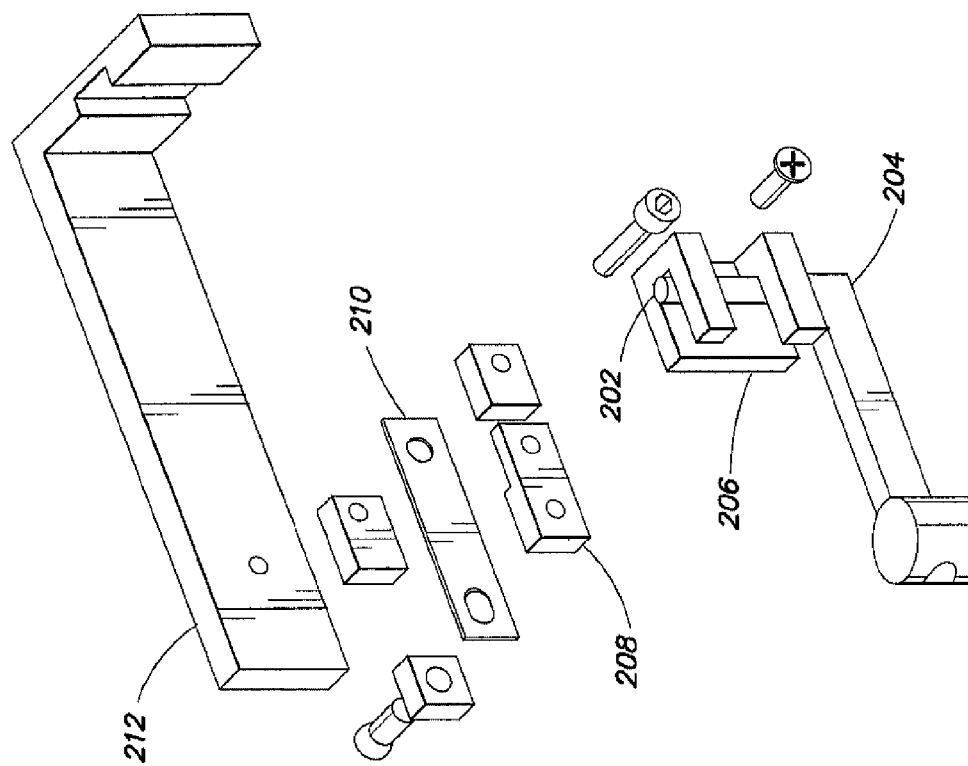
FIG. 2 is an illustration of a portion of the apparatus of FIG. 1 that includes the probe arm and force sensor.

FIG. 2 is an exploded view of the end of the probe arm that engages the force sensor, as indicated at 116 in FIG. 1. Engagement pin 202 at end 204 of probe arm 114 is shown engaged with adaptor 206. When the body of the rotary encoder is rotated, a drag exerted on the encoder shaft by the encoder body causes a torque at probe arm end 112 (FIG. 1) that is converted into a force at the far end of the probe arm that engages with adaptor 206. The force is in turn exerted against load cell block 208 of the force sensor, causing a deformation of load cell beam 210. The load cell beam is able to convert the deformation into an electrical signal. Load cell block 208 and beam 210 as well as other components (not shown) comprise the force sensor. Accurate measurement of the force used to calculate torque requires that force be applied perpendicular to the plane of the sensor, which corresponds to the plane of load cell beam 210. The force times the probe arm length corresponds to the torque. The clockwise and counter clockwise, or the positive and negative torque, is calculated from the positive and negative force at the force sensor, which measures the forces by the pushing and pulling exerted on load cell block 208 through adaptor 206.

To ensure the above mentioned perpendicularity, the plane of the force sensor and the vertical plane that passes through the center line of the probe arm are aligned by means of x, y, z, adjustments to adjustable assembly 120 to which the force sensor is mounted. The alignment positions the force sensor plane (i.e., its load cell beam plane) to be parallel to the vertical center plane of the probe arm that intersects the rotational axis of the shaft of the mounted rotary encoder. Further adjustment may be made to ensure the plane of the force sensor is aligned vertically. This adjustment is achieved with bracket 212 in FIG. 2.

Figure 3:
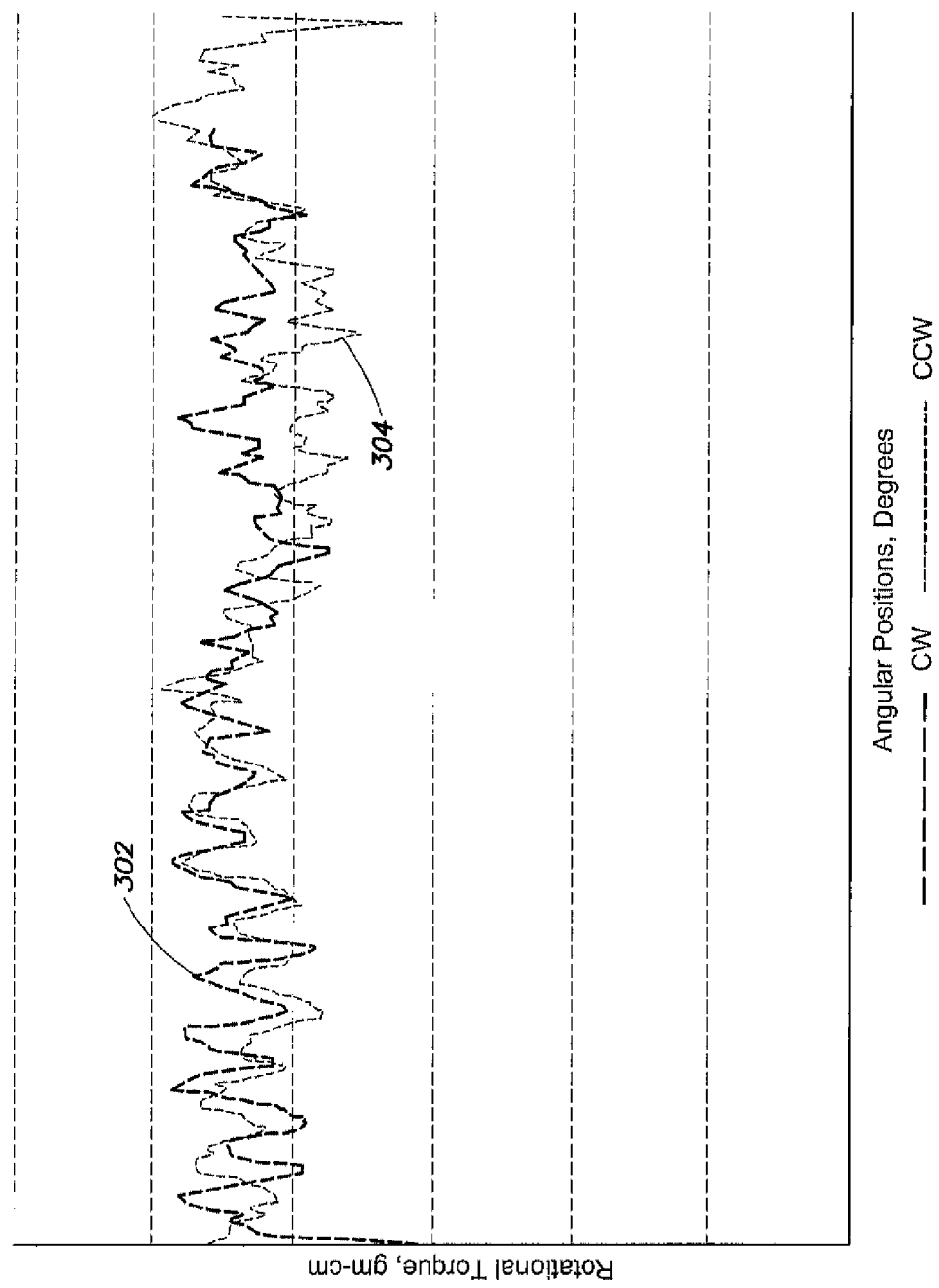
FIG. 3 shows encoder shaft torque as a function of encoder body angular position for an encoder body rotating at a constant rate using the described apparatus.
Figure 4:
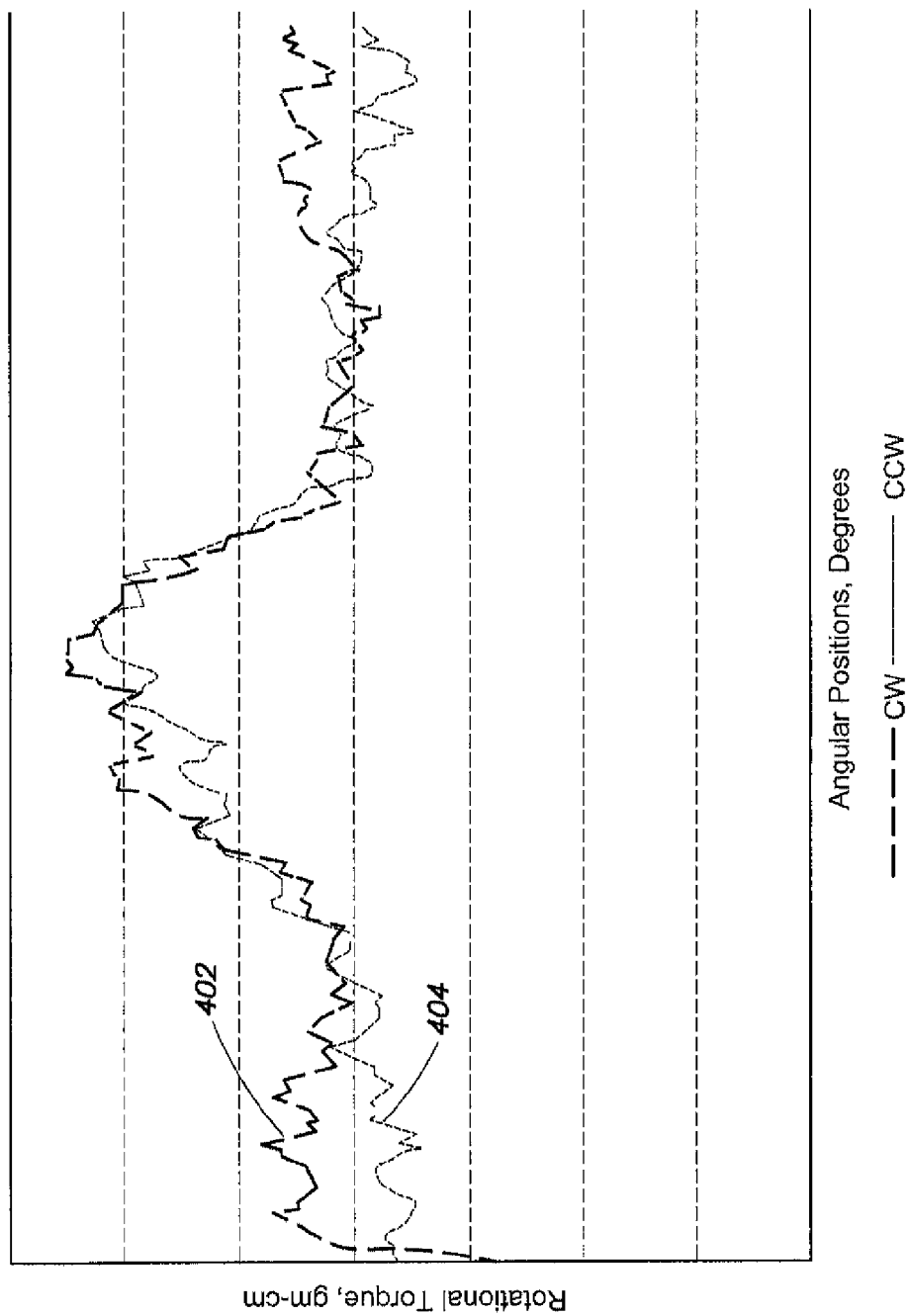
FIG. 4 shows torque measurements corresponding to those shown in FIG. 3 for a different test rotary encoder.

As indicated above, the subjective experience of a rotary encoder user is determined in part by the variation in torque of the encoder over a 0-360 degree range, with lower variations perceived as more desirable. By testing an encoder with a constant rotational speed, and logging successive torque samples, the variation may be determined. Examples of such a test runs conducted with the described torque measurement apparatus for two different encoders are illustrated in FIGS. 3 and 4 for which a constant rotational speed of 4 RPM was used. The graphs show the measured torque as a function of the angular position of the encoder body with respect to the stationary encoder shaft for clockwise (302, 402) and counter-clockwise (304, 404) rotation. The encoder tested in the run that provided the data for FIG. 3 was found to have a torque variation lower than that for the encoder tested in the run shown in FIG. 4.

Another factor that contributes to the subjective user experience of a rotary encoder is grittiness. This refers to rapid torque variations as the encoder shaft is rotated, i.e., small angular scale variations. A quantitative definition of torque grittiness is the maximum torque difference between successive data points. The encoder tested in the run illustrated in FIG. 3 exhibits a somewhat higher grittiness than the encoder tested in the FIG. 4.

Hysteresis also affects the subjective user experience. As used herein, hysteresis refers to the difference between the absolute values of the torque when measured during clockwise and counter-clockwise rotation. The quantitative value assigned to hysteresis is taken to be the difference between the absolute value of the mean of the torques measured during clockwise rotation and during counter-clockwise rotation.

With the ability to make quantitative measurements of the encoder properties that affect the subjective user experience, such as running torque variations, torque grittiness, and hysteresis, it becomes possible to quantify ranges of these properties that are acceptable or desired by users, and to use these ranges in a manufacturing specification for the encoders. Meeting such specifications may affect a manufacturer's choice of various encoder components.

The various components of the apparatus described herein may be arranged in various geometries other than those discussed above. For example, the axis of the probe arm may not intersect the axis of rotation of the rotary encoder (e.g., an L-shaped torque arm). In this case, the two axes define a set of parallel planes that are parallel to both of them, and the surface of the force sensor is aligned to lie in one of this set of planes. In some embodiments, the rotary encoder may be mounted with the shaft horizontal, and the torque arm and force sensor correspondingly rotated through 90 degrees. In other embodiments, other fixtures and adaptors may be utilized to measure torques from sources other than rotary encoders, such as the torque output from a miniature DC motor. The probe arm length measured from the center of rotation may be varied to scale the force applied to the force sensor to an optimal operating range of the force sensor, thereby enhancing the accuracy of the apparatus.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. An apparatus for measuring torque in a rotary encoder, the apparatus comprising:
   a rotary stage for mounting and rotating a body of the rotary encoder;
   a probe arm having a first end for engaging a shaft of the rotary encoder in a stationary position;
   a force sensor mounted on an adjustable assembly, wherein adjusting the adjustable assembly enables a surface of the force sensor to be placed in contact with a second end of the probe arm such that a face of the force sensor is parallel to an axis of the probe arm and an axis of rotation of the shaft of the rotary encoder.

2. The apparatus of claim 1, wherein the axis of the probe arm lies in a vertical plane bisecting the probe arm.

3. The apparatus of claim 1, wherein the axis of rotation of the shaft of the rotary encoder is vertical.

4. The apparatus of claim 1, wherein the axis of the probe arm intersects the axis of rotation of the shaft of the rotary encoder.

5. The apparatus of claim 1, wherein the rotary stage is capable of being rotated at a constant rate.

6. The apparatus of claim 5, wherein a direction of the rotation is a selectable one of clockwise and counterclockwise.

7. The apparatus of claim 1, wherein at least 10 data samples per second are generated from an output of the force sensor.

8. The apparatus of claim 1, wherein the apparatus is capable of measuring torque variations of less than 1 gram-centimeter.

9. The apparatus of claim 1, wherein the rotary stage is capable of rotating the body of the rotary encoder at one or more speeds within the range of 0.2 RPM to 16 RPM.

10. A method of measuring torque in a rotary encoder, the method comprising:
    mounting a body of the rotary encoder on a rotary stage;
    engaging a first end of a probe arm to a shaft of the rotary encoder;
    positioning a stationary force sensor in mechanical contact with a face of the probe arm adjacent to a second end of the probe arm such that a direction of maximum sensitivity of the force sensor is perpendicular to both an axis of the probe arm and an axis of rotation of a shaft of the rotary encoder; and
    measuring an output of the force sensor while the rotary stage is rotating the body of the rotary encoder.

11. The method of claim 10 wherein the rotary stage rotates the body of the rotary encoder at a constant speed and the measuring step comprises obtaining multiple measurements at constant temporal intervals.

12. The method of claim 11, further comprising analyzing the multiple measurements to derive a range of torque corresponding to a difference between a maximum and a minimum torque value.

13. The method of claim 11, further comprising deriving a torque grittiness based on a difference between successive measurements of the multiple measurements.

14. The method of claim 10, wherein rotating the body comprises successively rotating the body in a clockwise direction with respect to the shaft and a counter-clockwise direction with respect to the shaft.

15. The method of claim 14, further comprising determining a hysteresis of a rotational torque of the rotary encoder based on a difference between measurements obtained while rotating the body in a clockwise direction and while rotating the body in a counter-clockwise direction.

16. A method of measuring torque in a rotary encoder, the method comprising:
    mounting a body of the rotary encoder on a rotary stage;
    engaging a first end of a probe arm to a shaft of the rotary encoder;
    positioning a stationary force sensor in mechanical contact with a face of the probe arm adjacent to a second end of the probe arm such that a direction of maximum sensitivity of the force sensor is perpendicular to both a plane of the force sensor and a center plane of the probe arm; and
    measuring an output of the force sensor while the rotary stage is rotating the body of the rotary encoder.

17. The method of claim 16, wherein the center plane of the probe arm is vertically aligned.

18. The method of claim 16, wherein an axis of rotation of the shaft of the rotary encoder lies in a plane defined by a center plane of the probe arm.

* * * * *